Aug. 17, 1926.
H. A. FOOTHORAP
DROP PLATEN
Filed May 3, 1924
1,596,420
4 Sheets-Sheet 1
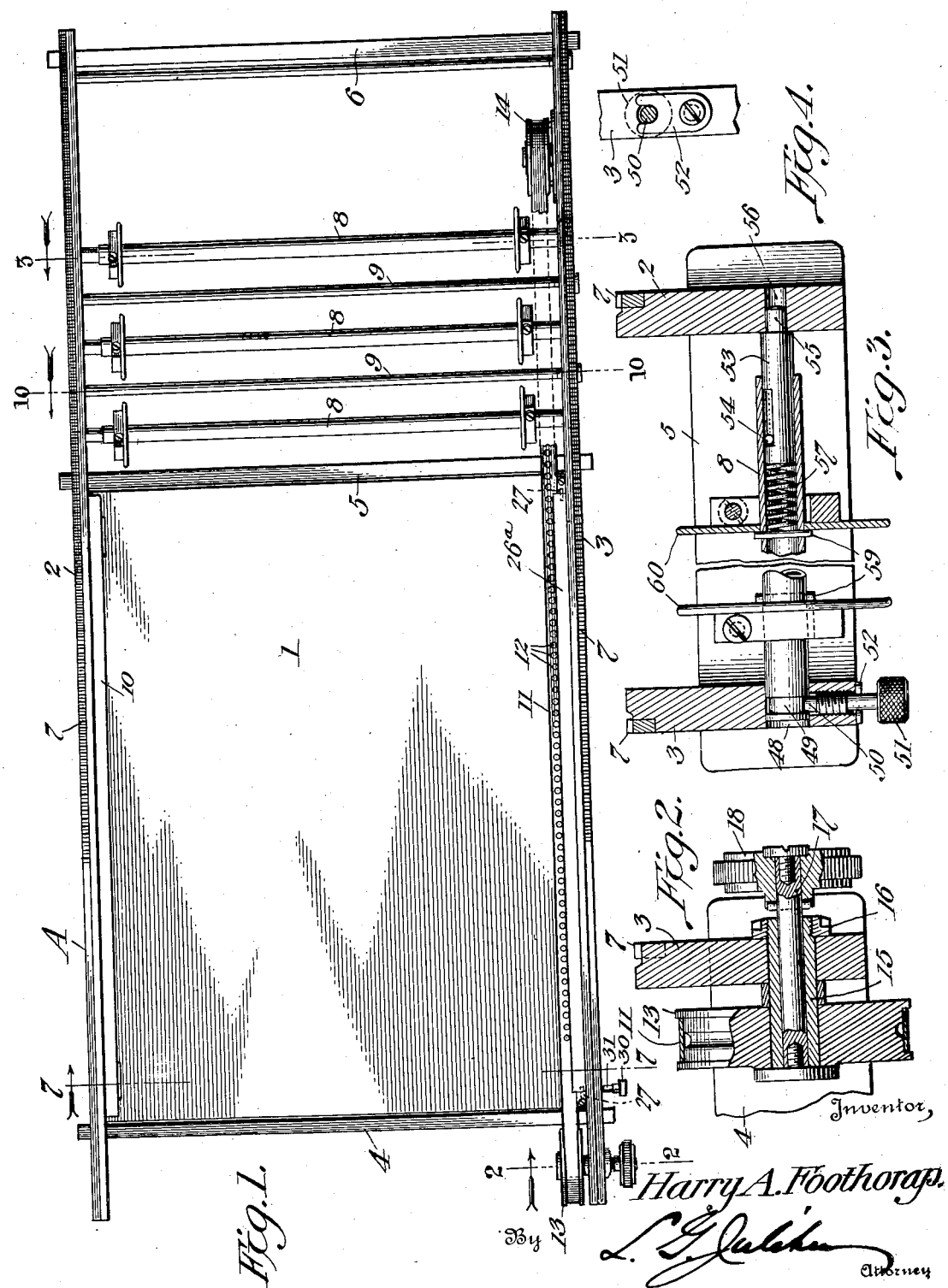
Inventor,
Harry A. Foothorap.
By
Attorney Aug. 17, 1926.

H. A. FOOTHORAP

DROP PLATEN

Filed May 3, 1924

Inventor,

By Harry A. Foothorap.

Attorney

Aug. 17, 1926.  
H. A. FOOTHORAP  
DROP PLATEN  
Filed May 3, 1924  
1,596,420  
4 Sheets-Sheet 3
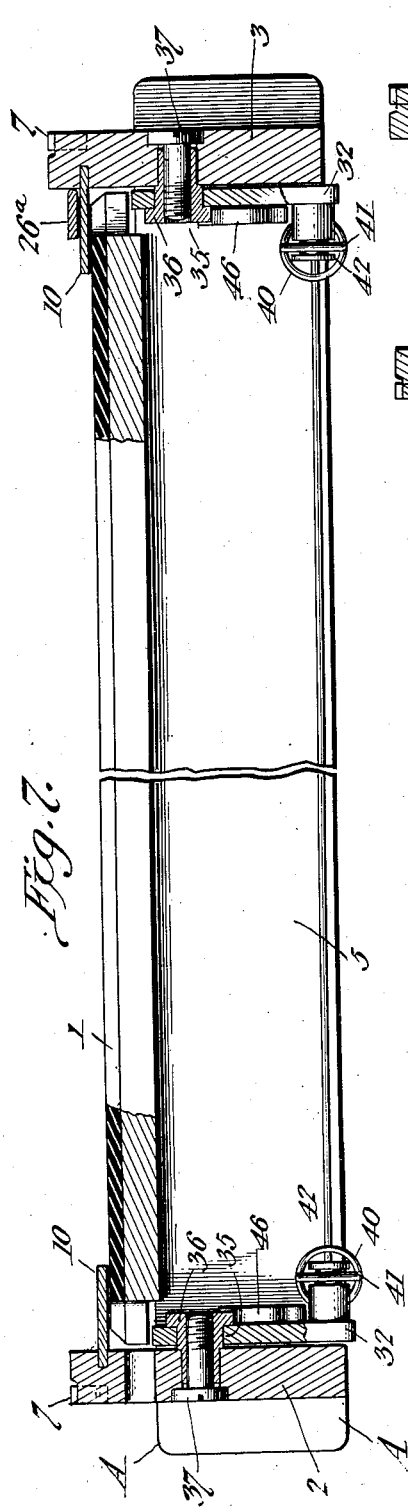
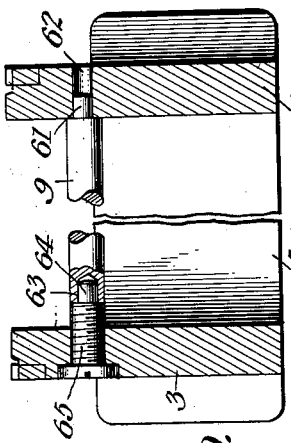
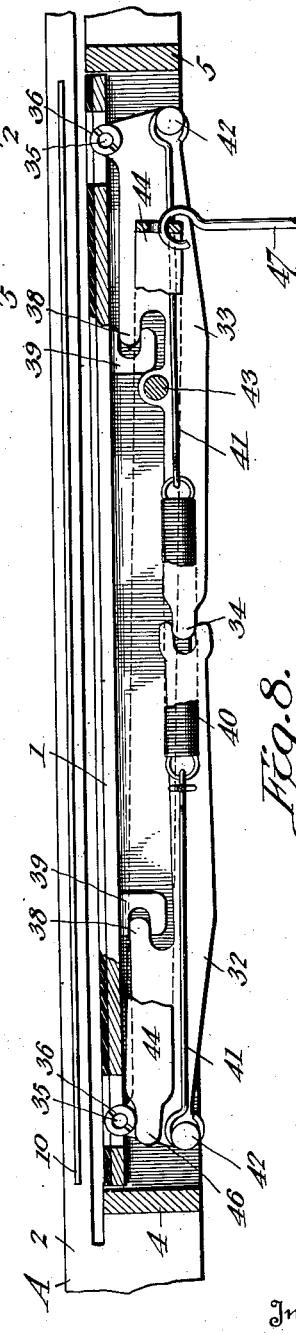
Inventor,  
Harry A. Foothorap.  
By  
Attorney Aug. 17, 1926.

H. A. FOOTHORAP

DROP PLATEN

Filed May 3, 1924

Inventor,
Harry A. Foothorap.
By L. G. Julihn
Attorney

Patented Aug. 17, 1926.

1,596,420

UNITED STATES PATENT OFFICE.

HARRY A. FOOTHORAP, OF HARRISBURG, PENNSYLVANIA, ASSIGNOR TO ELLIOTT-FISHER COMPANY, A CORPORATION OF DELAWARE.

DROP PLATEN.

Application filed May 3, 1924. Serial No. 710,809.

My present invention relates to a platen, its mounting and equipment designed for use in what is known as a flat platen typewriter.

The object of the invention is to provide a platen of this character with a mounting, operating means and equipment all constructed, not only with a view to efficiency in use but at the least possible cost and capable of the easiest and most economical assembly, adjustment and repair.

To the accomplishment of this general object and other subordinate objects which will more fully appear, the invention resides in the construction to be illustrated, described and claimed.

In the accompanying drawings:

Fig. 1 is a plan view of the platen.

Fig. 2 is a transverse section on the line 2—2 of Fig. 1.

Fig. 3 is a similar view on the line 3—3 of Fig. 1.

Fig. 4 is a detail view of the keeper and a paper roll retaining screw.

Fig. 7 is a transverse section on the line 7—7 of Figs. 1 and 6.

Fig. 8 is a longitudinal section showing the platen depressed.

Fig. 9 is a detail view of the connection between one of the platen operating levers and the platen.

Fig. 10 is a section on the line 10—10 of Fig. 1.

Figure 5:
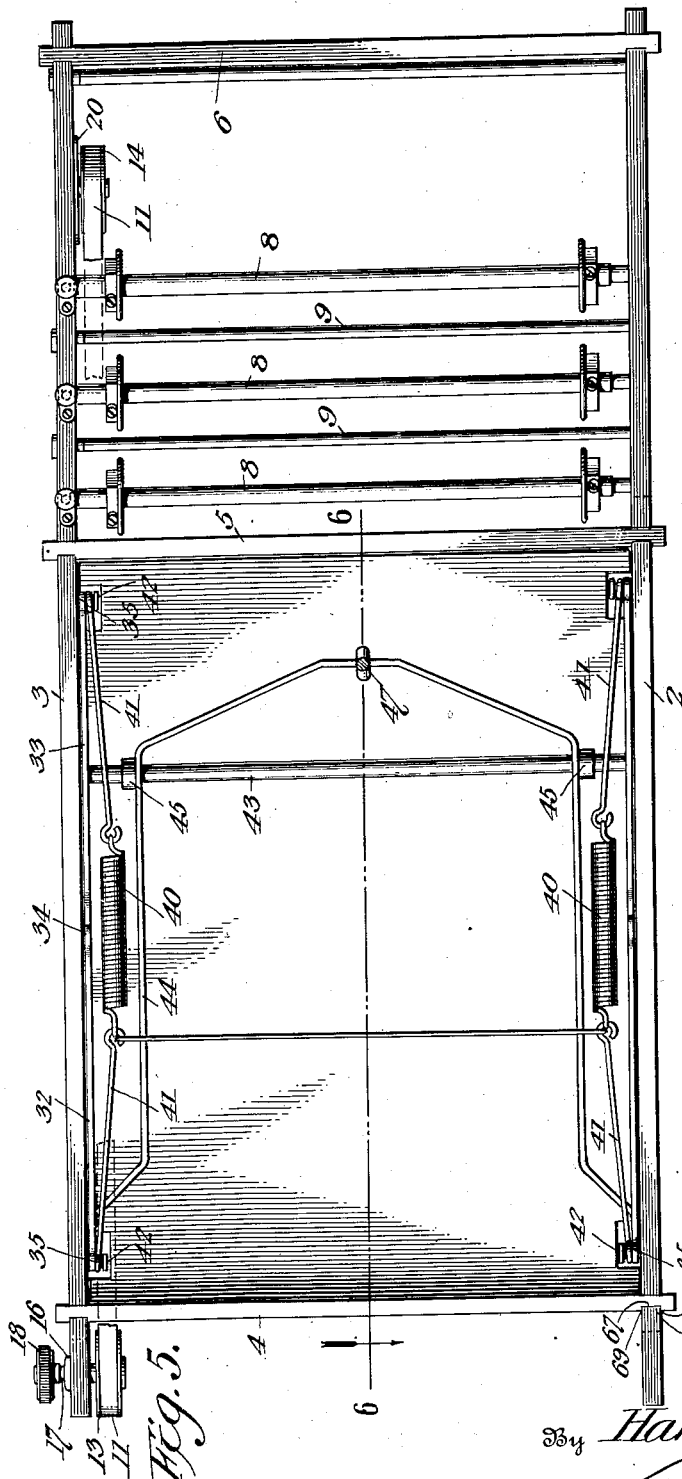
Fig. 5 is a bottom plan view of the platen.

The flat platent 1 is mounted in a frame A comprising parallel side members 2 and 3 and transverse frame members 4, 5 and 6, the members 4 and 5 being located at the front and rear ends of the platen and the member 6 being located at a sufficient distance in rear of the member 5 to provide a rearward extension of the frame for the reception of the machine when it is pushed back from the writing area. As is well understood in the art the machine travels on the side members 1 and 2 which act as rails, and the line spacing mechanism includes gearing afforded by pinions on the machine engaging tooth racks 7, which, in accordance with my present invention, are set into the upper outer corners of the side frame members.

Mounted on the frame in rear of the platen are any desired number of paper roll spindles 8, intermediate of which are idlers 9. Paper is led over the platen from paper rolls carried by the spindles 8 with the idlers 9 acting as guides for the paper webs.

Figure 12:
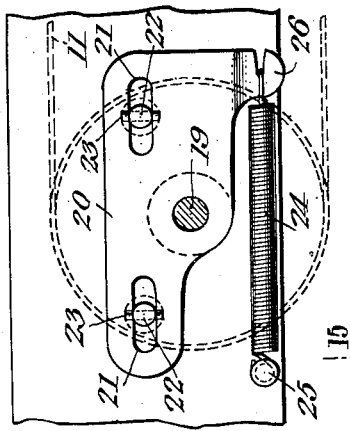
Fig. 12 is a detail view of one of the compensating bearings for a tape pulley 4.
Figure 13:
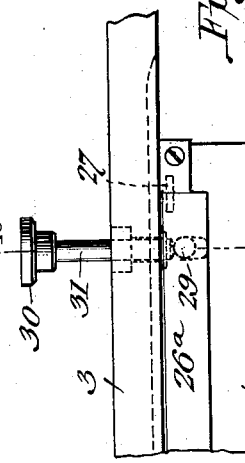
Fig. 13 is a plan view showing the clamp raising key.
Figure 14:
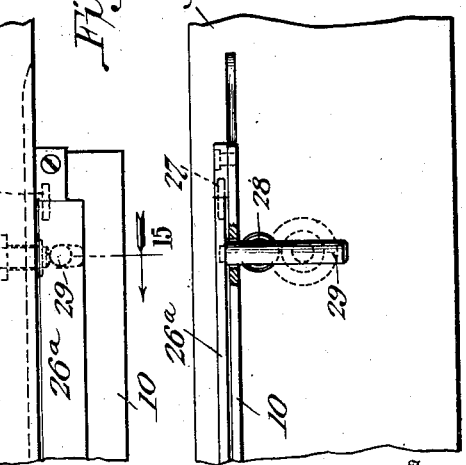
Fig. 14 is a detail view of the subject matter of Fig. 13 viewed from inside the frame.
Figure 11:
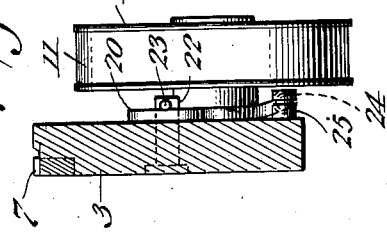
Fig. 11 is an elevation of one of the tape pulleys and its mounting.

The platen 1 is vertically movable and rises against work clamps in the form of metal strips 10 set into the inner faces of the side members of the frame and overlying the margins of the work sheets clamped in place on the platen by the clamping action between the platen itself and these clamping members 10 (see Fig. 7). Over one of these clamping members 10, usually the one at the right hand side of the platen, extends a work carrying tape 11 having work holding studs 12. This tape is of endless form and is passed around pulleys or rollers 13 and 14 located adjacent to the rear ends of the platen supporting frame. The mounting of the front roller 13 is clearly shown in Fig. 2 where it will be seen to be rotatable on a bearing sleeve 15 passed through and extended from the bar 3 and secured by a lock nut 16. The pulley or roller 13 is also connected to the shaft 17 of a knurled head or thumb wheel 18 by means of which the pulley may be rotated to shift the tape. The mounting of the other tape pulley 14 is shown in Figs. 12 and 13 wherein its shaft 19 is shown extended into a slidable bearing plate 20 having horizontal slots 21 engaged by pins 22 projecting from the member 3 of the frame. The plate 20 is held in place by keys 23 passed through the pins 22 and the plate is urged in a direction to tighten the tape by a spring 24 connected to the frame at 25 and having its opposite end connected to a hook 26 formed at the front rear corner of the plate 20.

Overlying the outer edge of the tape 11 and the work secured to the studs 12 is a clamping member 26ª hinged at its outer edge as by pintles 27 and held down in its clamping position by a spring 28 seated in the frame member 3 and secured to a pin 29 projecting downwardly from the plate 26 to facilitate the easy elevation of the clamp 26ª. A clamp operating key 30 is provided with a stem 31 extended through the member 3 and designed to urge the pin 29 laterally against the resistance of the spring 28. As soon as pressure is removed from the key, however, the spring 28 will return the clamp and its associated parts to normal position.

Figure 6:
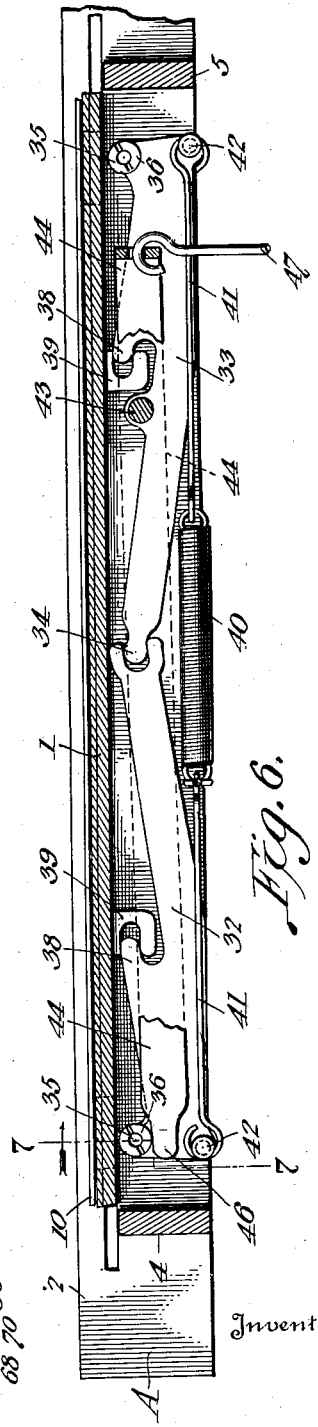
Fig. 6 is a longitudinal section on the line 6—6 of Fig. 5.
Figure 18:
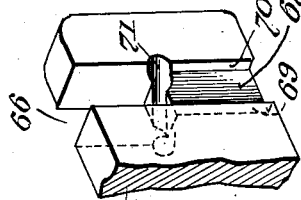
Fig. 18 is a view of the same structure seen from a different angle.
Figure 16:
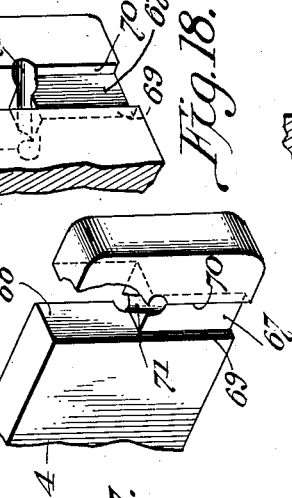
Fig. 16 is a detail perspective view of one of the frame joints.
Figure 19:
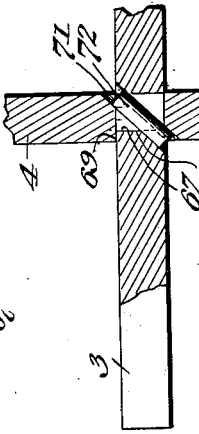
Fig. 19 is a sectional view through the frame joint.
Figure 17:
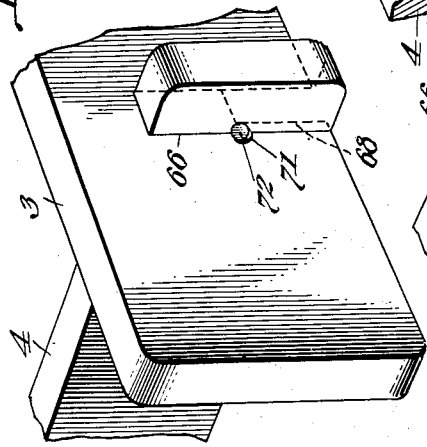
Fig. 17 is a perspective view of one end of one of the transverse frame bars.
Figure 15:
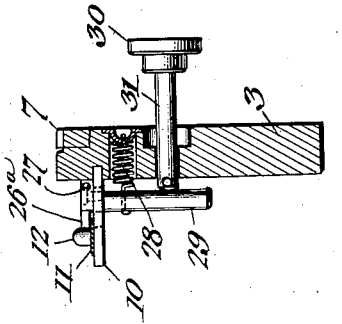
Fig. 15 is a detail section on the line 15—15 of Fig. 13.

The platen is supported and operated by a pair of levers 32 and 33 arranged in pairs at opposite sides of the frame. The levers composing each pair are connected at their inner ends by an interfitting, as indicated at 34, and are fulcrumed at their outer ends, as indicated at 35, on bearing sleeves 36 extended into the adjacent frame member and retained in place by headed screws 37. Intermediate of its ends each lever is formed with an integral projection 38 received by a hook 39 secured to the under side of the platen (see Fig. 6). Each pair of levers is urged in a direction to elevate the platen by a spring 40 connected by draw rods 41 with headed studs 42 secured to the outer ends of the levers and located below and in spaced relation to the fulcrums thereof.

Extended across the platen and connecting the two levers 33 at opposite sides thereof is a cross bar 43 passed through the rear end of a bail 44 spaced from the sides of the platen by collars 45 on the bar 43 and having its front ends deflected and reduced, as indicated at 46, and underlying the bearing sleeves 36 on which the platen operating levers are fulcrumed. To the rear end of the bail 44 is connected the hooked upper end of a draw rod 47 extended down to a treadle or other operating device (not shown.) The depression of the treadle will obviously swing the bail 44 downwardly against the resistance of the springs 40 opposing the movement of the levers 32 and 33 which necessarily follow the movement of the bail by reason of the cross bar connection 43. Likewise, since the levers are connected to the platen hooks 39, the platen will necessarily be depressed and thus separated from the clamping members 10 to permit the displacement, replacement or adjustment of the work sheets. When the force applied to the draw rod 47 is relieved the springs will exert their force to swing the levers 32 and 33 in the opposite direction for the purpose of elevating the platen to its normal position to again clamp the work sheets imposed thereon against the members 10.

Another of the detailed improvements of the structure is shown in Fig. 3 which illustrates the construction and mounting of one of the paper roll spindles. The spindle 8 extends between the side members of the frame and is of tubular form with one end extended into an aperture 48 in the frame member 3 and provided with an annular groove or channel 49 which receives the upper end of a retaining screw 50 passed into the under side of the member 3 and having a knurled head 51. The movement or withdrawal of the screw 50 from the spindle to release the latter for endwise movement is limited by a keeper plate 52. The opposite end of the spindle 8 terminates a short distance from the frame member 2 and receives a cylindrical plunger 53 recessed to accommodate a stop pin 54 passed through the spindle 8 to limit the longitudinal movement of the plunger within the spindle. The plunger has a reduced outer end 55 received within an opening 56 in the member 2 and is urged outwardly by a spring 57 coiled within the spindle 8 and bearing at its opposite end against one of two pins 59 passed diametrically through the spindle and serving to locate the spool flanges 60 between which the roll of paper is confined. When it is desired to remove a spindle constructed and mounted as described it is merely necessary to back the screw 50 out of the channel 49 when, as will be apparent, the spindle and plunger may be telescoped to withdraw them from the frame members. Each idler 9 has a reduced end 61 extended into an opening 62 in the frame member 2 and at its opposite end is provided with a circular recess 63 to receive the reduced ends 64 of a bearing screw 65 screwed through the member 3.

One of the subordinate objects of the invention is to simplify and cheapen the construction of the platen supporting frame. This end is attained by forming the longitudinal and transverse frame members of stock steel and connecting them by joints formed primarily by interlocking the members in such a way as to resist the distortion of the frame in any direction and requiring only a small locking pin to insure the interlocking relation of the interfitting members. By reference to Figs. 17 to 20 it will be seen that this joint is effected by cutting out the transverse member 4, for instance, for approximately one-half of its depth and of a width to accommodate the thickness of the connected member 3. This cut-out or opening extending downwardly from the upper edge of the member 4 is indicated by 66. Below this cut-out 66 and in line with its walls the side face of the member 4 is formed with a deep groove 67 so that the metal lying between the groove and the opposite side of the member 4 and below the cut-out 66 is thinner than the member itself. This formation of the cut portion of the member 4 merely requires that the longitudinal member 3 be cut out from the under side, as indicated at 68, to receive the thickness of metal between the groove 67 and the other side of the transverse member. This will obviously result in the material of the member 3 above the cut-out 68 being closely fitted within the cut-out 66 of the member 4, and will also result in the material of the member 4 below the cut-out 66 being closely fitted within the cut-out 68 of the member 3. In addition the material of the member 3 will extend into the groove 67, the shoulders 69 and 70 formed by said groove abutting flush against the outer faces of the member 3. This interfitting of the members will result in great rigidity of the frame, distortion in any lateral direction being solidly resisted. It is only necessary to provide means resisting the tendency of the joined members to draw apart in a vertical direction, this tendency being induced merely by the weight of the transverse member. This is accomplished by boring a cylindrical pin seat 71 diagonally through the joint with its axis in the meeting plane of the two bottom walls of the cut-outs 66 and 68 in the respective members, so that a portion of the metal of the side member will underlie the locking pin 72 while a portion of the material of the transverse member 4 overlies said pin to support the transverse member and prevent it from dropping out of position.

What I claim is:

1. The combination with a platen supporting frame, of platen supporting levers having independent mountings on the side members of the frame, means for compelling the movement of said levers in unison, and springs having their opposite ends connected to opposed levers to elevate the platen.

2. The combination with a platen supporting frame and platen, of a pair of interfitting platen supporting levers mounted on each of the side members of the frame, a cross bar connecting levers at opposite sides of the platen frame, and springs connected at their opposite ends to opposed levers to swing the same in a direction to elevate the platen.

3. The combination with a platen frame and platen, of hooks secured to the platen adjacent to opposite side members of the frame, a pair of interfitting operating levers mounted on each of the side members of the frame and engaging the hooks, a cross bar connecting levers located at opposite sides of the platen, springs tending to urge the levers in a direction to elevate the platen, and means for moving the levers in opposition to the springs.

4. The combination with a platen frame and platen, of hooks secured to the platen adjacent to opposite side members of the frame, a pair of interfitting operating levers mounted on each of the side members of the frame and engaging the hooks, a cross bar connecting levers located at opposite sides of the platen, springs tending to urge the levers in a direction to elevate the platen, and a bail for moving the levers in opposition to the springs.

5. The combination with a platen frame and platen, of hooks secured to the platen adjacent to opposite side members of the frame, a pair of interfitting operating levers mounted on each of the side members of the frame and engaging the hooks, a cross bar connecting levers located at opposite sides of the platen, springs tending to urge the levers in a direction to elevate the platen, and a bail for moving the levers in opposition to the springs, the ends of said bail engaging the mountings of the levers at one end of the platen frame.

6. The combination with a platen frame and platen, of bearing sleeves carried by the side members of the frame adjacent to the opposite ends thereof, a pair of levers fulcrumed on the bearing sleeves at each side of the frame, the levers constituting each pair being interfitted at their adjacent ends and having interfitting relation with the platen at points intermediate of their ends, a cross bar connecting levers at opposite sides of the platen, a bail for moving the levers to depress the platen, and springs tending to elevate the platen.

7. The combination with a platen frame and platen, of bearing sleeves carried by the side members of the frame adjacent to the opposite ends thereof, a pair of levers fulcrumed on the bearing sleeves at each side of the frame, the levers constituting each pair being interfitted at their adjacent ends and having interfitting relation with the platen at points intermediate of their ends, a cross bar connecting levers at opposite sides of the platen, a bail for moving the levers to depress the platen, said bail being connected to the cross bar and having its ends unattached but disposed to bear against the bearing sleeves of the levers.

8. The combination with a platen frame and platen, of an endless work holding tape, guide rolls for the tape, a thumb wheel for rotating one of the guide rolls, and a spring urged bearing for the other roll.

9. The combination with a platen frame and platen, of an endless work holding tape, guide rolls for the tape, a thumb wheel for rotating one of the guide rolls, a spring urged bearing for the other roll, said bearing including a slotted plate mounted on a side member of the frame.

10. The combination with a platen frame and platen and a work holder movable thereon, of a hinged work clamp carried by the frame and disposed within the same to coact with the work holder, and a clamp operating key located outside of the platen frame and connected to the clamp to operate the same.

11. The combination with a platen frame and platen, of a movable work holder, a hinged work clamp carried by a frame member at the inner side thereof and coacting with the work holder, a key located at the outer side of said frame member, and an operating connection between the key and clamp.

12. The combination with a platen frame and platen, of a clamp hinged to the inside of one of the frame members, a pin extended from the clamp, a spring carried by the frame member and engaging the pin, and a key having its stem passed through the frame member and engaging the pin.

13. The combination with a frame and openings in opposite members thereof, of a tubular spindle extended into one of said openings, a spring urged plunger mounted in the spindle and extended into the other opening, and a retaining device carried by one frame member and preventing endwise movement of the spindle.

14. The combination with frame members having openings, of a tubular spindle having spool flanges and also having an annular groove at one end, the grooved end of the spindle being extended into the opening of one member, a retaining screw carried by said member and having one end extended into the annular groove and its opposite end accessible for manipulation, a plunger mounted in the opposite end of the tubular spindle and extended into the opening of the other frame member, a spring urging the plunger in one direction, and means for limiting the independent movement of the plunger.

15. The combination with a frame member having a recess extended from one edge thereof, of a second frame member having a recess extended from the opposite edge thereof whereby a joint may be effected by interfitting the members and recesses, and a pin passed diagonally through the joint thus formed in the plane of the bottom walls of the recesses.

16. The combination with a member having a recess extended from one edge thereof and a groove aligned with the walls of the recess and extended to the opposite edge of the member, a second member having a recess to receive the member first named and extended into both the recess and groove of the first named member, and a pin passed diagonally through the joint formed by the interfitting of the members and having its axis located in the plane of the bottom faces of the two recesses.

17. The combination with a platen frame and platen, of a pair of interfitting levers mounted on the frame at each side thereof and having interfitting relation with the platen.

18. The combination with a platen frame and platen, of a pair of interfitting levers mounted on the frame at each side thereof and having interfitting relation with the platen, and platen elevating springs each common to both levers of one pair.

19. The combination with a platen frame and platen, of bearing sleeves carried by the side members of the frame adjacent to the opposite ends thereof, and a pair of levers fulcrumed on the bearing sleeves at each side of the frame, the levers constituting each pair being interfitted at their adjacent ends and having interfitting relation with the platen at points intermittent of their ends.

In testimony whereof I hereunto affix my signature.

HARRY A. FOOTHORAP.